US011814206B2

(12) United States Patent
Pettersson (10) Patent No.: US 11,814,206 B2
(45) Date of Patent: Nov. 14, 2023

(54) ADAPTIVE ACCELERATION CONTROL FOR PACKAGING MACHINE

(71) Applicant: Packsize LLC, Salt Lake City, UT (US)

(72) Inventor: Niklas Pettersson, Västerås (SE)

(73) Assignee: Packsize LLC, Salt Lake City, UT (US)

( * ) Notice: Subject to any disclaimer, the term of this patent is extended or adjusted under 35 U.S.C. 154(b) by 175 days.

(21) Appl. No.: 17/266,284

(22) PCT Filed: Aug. 30, 2019

(86) PCT No.: PCT/US2019/049102
§ 371 (c)(1),
(2) Date: Feb. 5, 2021

(87) PCT Pub. No.: WO2020/051090
PCT Pub. Date: Mar. 12, 2020

(65) Prior Publication Data
US 2021/0300612 A1    Sep. 30, 2021

Related U.S. Application Data

(60) Provisional application No. 62/728,456, filed on Sep. 7, 2018.

(51) Int. Cl.
*B65B 57/16* (2006.01)
*B65B 35/24* (2006.01)
(Continued)

(52) U.S. Cl.
CPC .............. *B65B 57/16* (2013.01); *B65B 5/024* (2013.01); *B65B 35/24* (2013.01); *B65B 35/44* (2013.01);
(Continued)

(58) Field of Classification Search
CPC ....... B65B 57/16; B65B 59/001; B65B 5/024; B65B 35/24; B65B 35/44; B65B 59/02;
(Continued)

(56) References Cited

U.S. PATENT DOCUMENTS

| 4,921,092 A | * | 5/1990 | Crawford | ................ B65B 57/16 |
| | | | | 198/460.1 |
| 5,082,103 A | * | 1/1992 | Ross | ...................... B65G 47/31 |
| | | | | 198/572 |

(Continued)

FOREIGN PATENT DOCUMENTS

| CN | 103048262 A | 4/2013 |
| CN | 203699264 U | 7/2014 |

(Continued)

OTHER PUBLICATIONS

Fleck, Norbert, Packaged Goods E.g. Container, Grouping Device, Has Position Detecting Device to Detect Position of Part of Packaged Goods With Respect to Transport Plane and to Output Position Signal, Which Is Characterized for Detected Position of Goods, Jul. 5, 2007, DE, DE 102005063193 (Year: 2007).*

(Continued)

*Primary Examiner* — Gene O Crawford
*Assistant Examiner* — Lester III Rushin
(74) *Attorney, Agent, or Firm* — WORKMAN NYDEGGER (57) ABSTRACT

A method of adjusting accelerations within a packaging machine includes determining the dimensions and frictional coefficients of each product or group of products that are placed on a product feeder 106. Acceleration profiles of first and second drive lines 200, 202 can be adjusted to ensure that the products are moved through the packaging machine at appropriate speeds and accelerations. The method may ensure that the products maintain proper positions through- (Continued)

out the packaging process so that the products are not damaged, and the packaging process is not hindered. A packaging machine with means for determining the coefficient of friction associated with a product is also provided.

28 Claims, 7 Drawing Sheets

(51) Int. Cl.
  *B65B 35/44* (2006.01)
  *B65B 59/02* (2006.01)
  *B65G 43/08* (2006.01)
  *B65B 59/00* (2006.01)
  *B65B 5/02* (2006.01)

(52) U.S. Cl.
  CPC ............ *B65B 59/001* (2019.05); *B65B 59/02* (2013.01); *B65G 43/08* (2013.01); *B65B 2210/04* (2013.01); *B65G 2203/0225* (2013.01); *B65G 2203/0233* (2013.01); *B65G 2811/095* (2013.01)

(58) Field of Classification Search
  CPC ................ B65B 2210/04; B65G 43/08; B65G 2203/0225; B65G 2203/0233; B65G 2811/095
  See application file for complete search history.

(56) References Cited

U.S. PATENT DOCUMENTS

| | | | |
|---|---|---|---|
| 5,335,777 A | 8/1994 | Murphy | |
| 7,220,094 B2 * | 5/2007 | Cerutti | B65B 23/14 |
| | | | 198/474.1 |
| 7,647,752 B2 | 1/2010 | Magnell | |
| 10,843,876 B2 * | 11/2020 | Dugat | B65G 47/71 |
| 2008/0020916 A1 | 1/2008 | Magnell | |
| 2011/0315514 A1 | 12/2011 | Lim et al. | |
| 2015/0224731 A1 | 8/2015 | Ponti | |
| 2016/0200466 A1 * | 7/2016 | Haigh | B65B 59/02 |
| | | | 53/64 |
| 2017/0362036 A1 | 12/2017 | Hartmann et al. | |

FOREIGN PATENT DOCUMENTS

| | | | | |
|---|---|---|---|---|
| CN | 106163970 A | 11/2016 | | |
| CN | 107628422 A | 1/2018 | | |
| DE | 102005063193 A1 * | 7/2007 | ............ | B65G 43/08 |
| DE | 102005063193 A1 | 7/2007 | | |
| JP | 2000-211730 A | 8/2000 | | |
| JP | 2005-153990 A | 6/2005 | | |
| JP | 2015-530291 A | 10/2015 | | |
| RU | 2127702 C1 | 3/1999 | | |
| WO | 2007/055112 A1 | 5/2007 | | |

OTHER PUBLICATIONS

International Search Report and Written Opinion issued in PCT/US2019/049102 dated Dec. 2, 2019.

* cited by examiner

ADAPTIVE ACCELERATION CONTROL FOR PACKAGING MACHINE

CROSS-REFERENCE TO RELATED APPLICATIONS

This application claims priority to and the benefit of PCT Application No. PCT/US2019/049102, filed Aug. 30, 2019, entitled "ADAPTIVE ACCELERATION CONTROL FOR PACKAGING MACHINE", which claims priority to and the benefit of U.S. Provisional Patent Application Ser. No. 62/728,456, filed Sep. 7, 2018 and entitled "Acceleration Control for Packaging Machine,". Each of the aforementioned applications are incorporated by reference herein in their entirety.

BACKGROUND

Technical Field

The present disclosure relates to packaging machines. More specifically, the present disclosure relates to methods and apparatus for adapting acceleration for packaging machines.

The Relevant Technology

Sales of goods and services via the internet have risen sharply in recent years and this trend is expected to continue. The vast majority of online orders are shipped to the customer, requiring most products purchased online to be packaged for shipping. With the wide range of products being ordered, packaging can present a number of challenges for manufacturers and distributors. For example, while products of all shapes and sizes need to be packaged and sent to customers, manufacturers and/or distributors may use packaging machines that are only capable of packaging products of a particular size or small range of sizes.

In addition, when a customer orders products online, they may order two or more products together. Rather than packaging each product separately, the manufacturer and/or distributor may save space and time by packaging two or more products together in a single package. However, current packaging machines limit manufacturers' and/or distributors' ability to stack or otherwise combine two or more products of a single order within a single package. Current packaging machines are generally designed to only handle certain sizes and/or combinations of products ordered by a customer. Along these lines, it is not feasible for manufacturers and/or distributors to redesign or reconfigure their existing packaging machines to accommodate each unique customer order on the fly. As such, current packaging machines lack the ability to effectively adapt to various sizes and combinations of products ordered by customers online.

One issue current packaging machines have with handling such a wide range of products and product combinations is products shifting, tipping, or otherwise falling out of position during the packaging process. For example, packaging machines usually include one or more conveyor belts that transport products into, through, and out of the packaging machine. Often, the products are transferred from one conveyor belt to the other. The speeds and/or accelerations with which these various conveyor belts transport products or transfer products from one conveyor belt to the next are not typically set based on the dimensions of the product(s) and friction between the product(s) and the conveyor belts. Thus, a conveyor belt of a packaging machine having a pre-set speed and/or acceleration may cause some products to tip, shift, or otherwise fall out of position while being transported on various conveyor belts.

Products that are stacked on top of one another to be packaged as a single unit add further complexity and difficulty to packaging processes. Products being transported down one or more conveyor belts for packaging have varying coefficients of friction that depend on the materials of the product. Furthermore, any two products contacting one another as they are transported along conveyor belts may have different amounts of friction therebetween. Like products that are too light or too tall for existing packaging machines, products or groups of products that have low friction between the product and conveyor belt, or between stacked products, may shift, tip, or otherwise fall out of position if the speed or acceleration of the conveyor belts are too high. However, lowering the acceleration of the various conveyor belts to accommodate all or a majority of products that may be ordered by customers diminishes production.

Again, one will appreciate that it is not feasible for manufacturers and/or distributors to redesign or reconfigure their existing packaging machines to handle the variable frictional properties of products being ordered and packaged.

Accordingly, there are a number of problems in the art that need to be addressed. The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

The present disclosure relates to packaging machines. More specifically, the present disclosure relates to adaptable speed and/or acceleration control for packaging machines. For example, in an embodiment of the present disclosure, a method of feeding products into a packaging machine includes placing one or more products on a first drive line. The dimensions and/or weight of the products and the friction between the products and the first drive line are determined. In addition, the first drive line has a speed and/or an acceleration profile that can be adjusted based on the determined dimensions and/or weight and friction of the one or more products. The first drive line can transfer the one or more products onto a second drive line.

In an embodiment of the present disclosure, a method of feeding products into a packaging machine includes placing one or more products on a first drive line and determining the dimensions and/or weight of the one or more products. In addition, a first friction between the one or more products and the first drive line can also be determined. Likewise, a second friction between the one or more products and a second drive line can be determined. The one or more products are transferred from the first drive line to the second drive line, each drive line having a speed and/or an acceleration profile. The speed and/or acceleration profiles of the first and second drive lines can be adjusted based on the first friction, second friction, and dimensions and/or weight of the one or more products.

In an embodiment of the present disclosure, a packaging machine includes a first drive line and a second drive line. The first drive line includes a first conveyor mechanism that guides one or more products along the first drive line and a translating mechanism. The translating mechanism is configured to translate the first drive line in at least two directions. The second drive line comprises a conveyor mechanism as well. The packaging machine also includes a scanning mechanism configured to determine dimensions and/or weight and one or more coefficients of friction associated with the one or more products being packaged by the packaging machine.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Additional features and advantages of the disclosed embodiments will be set forth in the description which follows, and in part will be obvious from the description, or may be learned by the practice of the disclosure. These and other features will become more fully apparent from the following description and appended claims or may be learned by the practice of the present disclosure.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

The present disclosure relates to packaging machines. More specifically, the present disclosure relates to adaptable acceleration control for packaging machines. For example, in an embodiment of the present disclosure, a method of feeding products into a packaging machine includes placing one or more products on a first drive line. The dimensions and/or weight and center of gravity of the products and the friction between the products and the first drive line are determined. In addition, the first drive line has a speed and/or an acceleration profile that can be adjusted based on the determined dimensions and friction of the one or more products. The first drive line can transfer the one or more products onto a second drive line.

Embodiments of the present disclosure solve one or more of the problems in the art discussed above by providing methods and apparatus for adapting speeds and/or accelerations of packaging machines based on certain parameters of products and products being packaged. For example, one or more embodiments of the present disclosure may alter the speed and/or acceleration profiles of one or more conveyor belts so that products of various sizes, shapes, weights, centers of gravity, and frictional coefficients placed thereon do not tip, slip, or otherwise fall out of position while being moved through the packaging machine. As such, one or more embodiments of the present disclosure may enable manufacturers and distributors to rapidly and effectively package any number of product sizes and combinations thereof while using a single packaging machine that adapts to products on the fly.

As used herein, the term "acceleration" should be understood to also include deaccelerations of speeds as well as the increase of speed.

Figure 1:
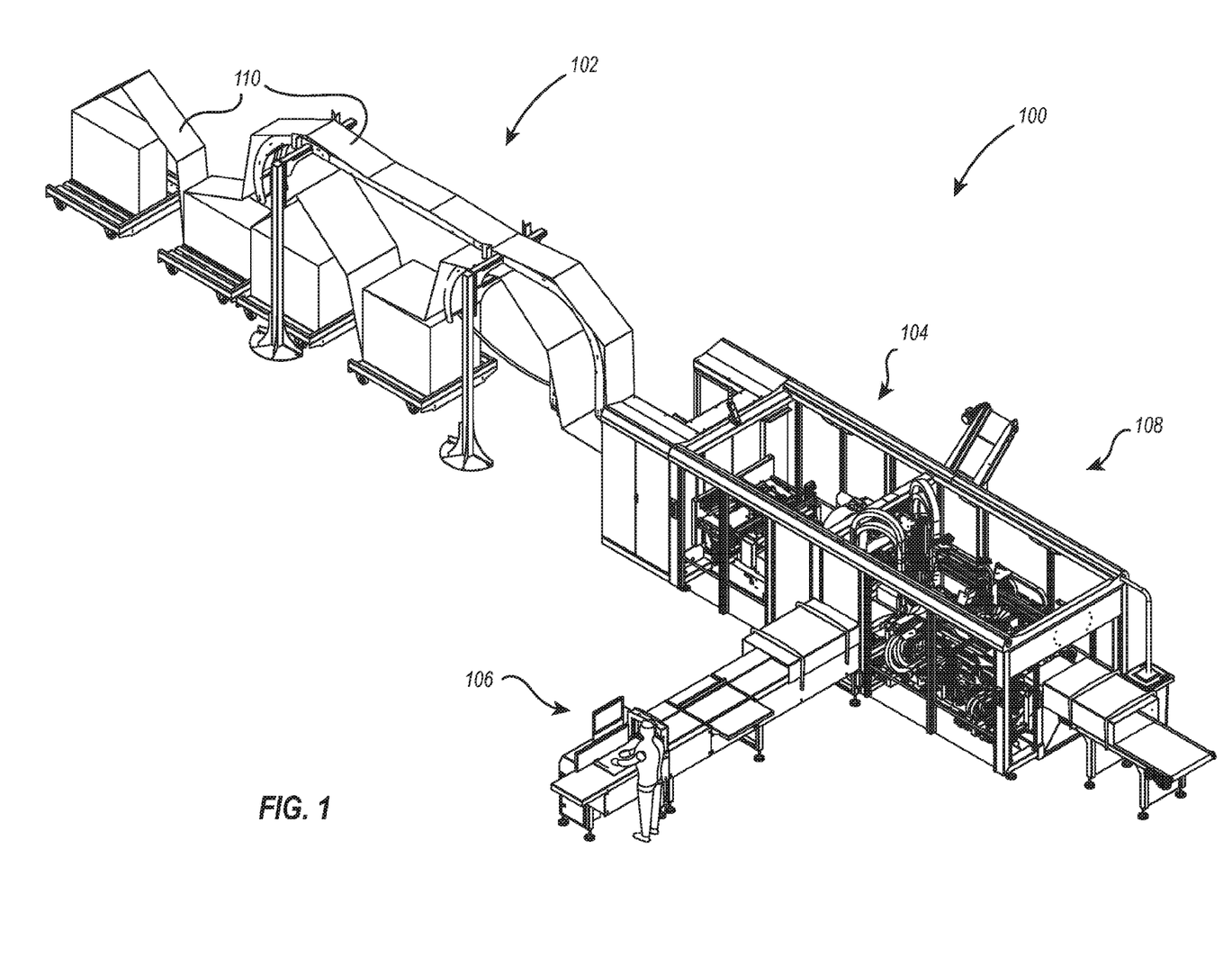
FIG. 1 illustrates an exemplary packaging system, including a material feeder system, a blank cutting machine, a product feeder, and a box forming machine.

Turning now to the figures, FIG. 1 illustrates an exemplary packaging system 100, including a material feeder system 102, a blank cutting machine 104, a product feeder 106, and a box forming machine 108. As seen in FIG. 1, the material feeder system 102 includes various stacks of fanfold material 110, which may be fed into the blank cutting machine 104. Fanfold material 110 can be fed into the blank cutting machine 104 from the material feeder system 102. The blank cutting machine 104 may then cut the fanfold material 110 into planar box templates, as referred to as "blanks."

The blank cutting machine 104 may form blanks from the fanfold material 110 by cutting and creasing various panels and tabs into the fanfold material. The blank cutting machine 104 may then provide the blanks to the box forming machine 108. Subsequently, the box forming machine 108 may perform various blank folding steps to form packaging boxes from the blanks. Along these lines, the blank cutting machine 104 and the box forming machine 108 may comprise one or more drive lines that move the blanks from one machine to the next.

For example, in one embodiment, the drive line of the blank cutting machine 104 may comprise one or more conveyor mechanisms, such as conveyor belts, which carry the blank through the blank cutting machine 104 and into the box forming machine 108. Likewise, a drive line of the box forming machine 108 may comprise one or more conveyor mechanisms, such as conveyor belts, that carry the blank through the box forming machine 108.

Additionally, information/data regarding the dimensions of products being packaged by the packaging machine 100 may be provided to the blank cutting machine 104 prior to cutting each blank. The blank cutting machine 104 can use this information/data to cut blanks that can form boxes which are customized to the size of the products to be packaged therein. In this way, the blank cutting machine 100 may minimize wasted material and space within the boxes formed by the box forming machine 108.

In one embodiment of the present disclosure, after or while a blank is cut and before or while the blank is provided to the box forming machine 108, the product feeder 106 may transport one or more products onto the blank. In such an embodiment, the box forming machine 108 may then bend or fold the blank to form the packaging box around the one or more products placed on the blank.

Figure 2:
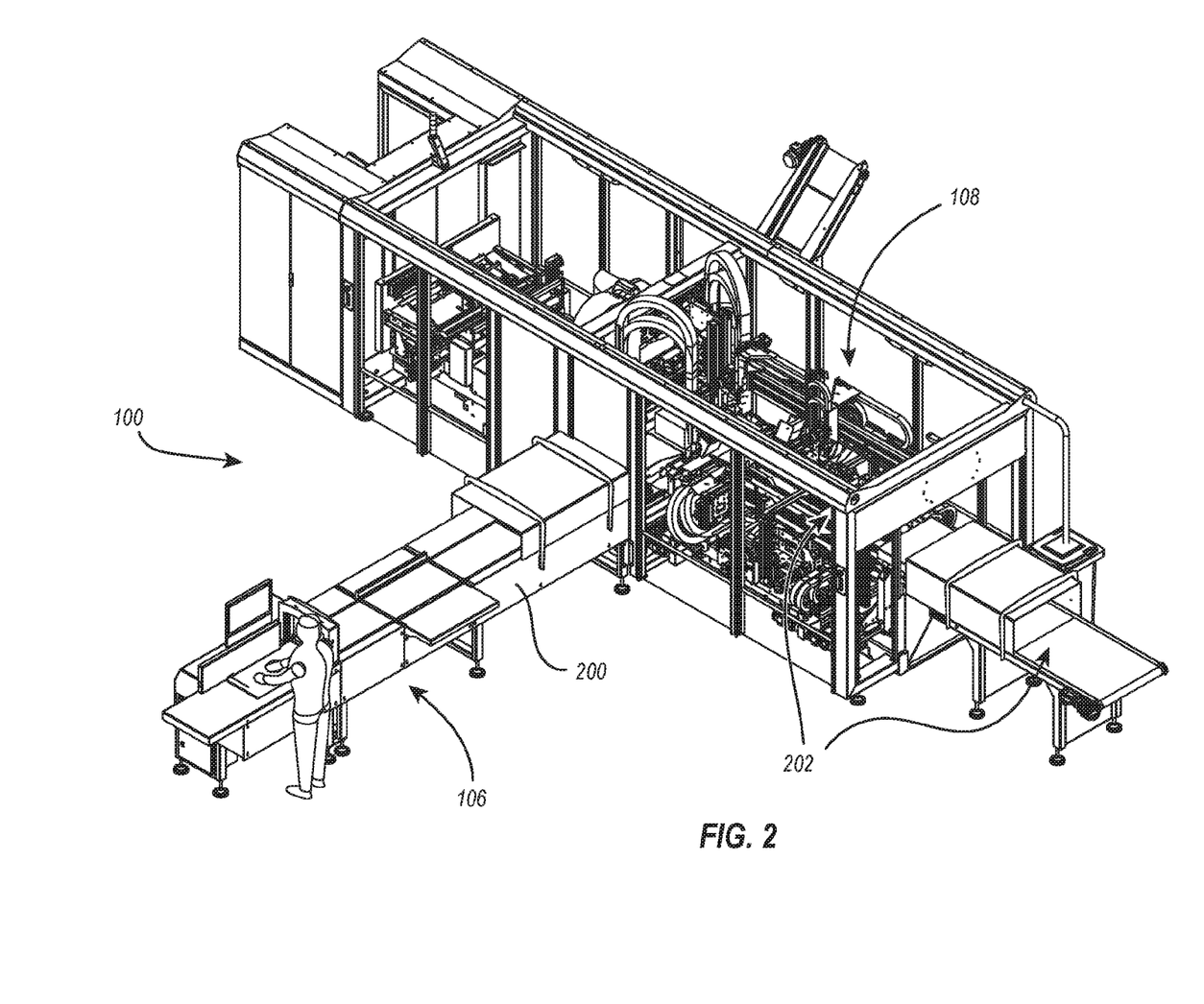
FIG. 2 illustrates a close-up view of a portion of the system illustrated in FIG. 1, including the product feeder and the box forming machine.

Accordingly, the packaging system 100 may comprise a product feeder 106 that transfers one or more products onto the blank. FIG. 2 illustrates a close-up view of the packaging system 100 to show the product feeder 106 and box forming machine 108 in more detail. As shown, the product feeder 106 may comprise a first drive line 200 extending toward the box forming machine 108. Likewise, the box forming machine 108 may comprise a second drive line 202 extending through the box forming machine 108. The second drive line 202 may be configured to carry the blank and one or more products placed thereon through the box forming machine 108 as the blank is folded into a packaging box, as noted above.

In the illustrated embodiment of FIGS. 1 and 2, the first drive line 200 of the product feeder 106 is positioned generally perpendicular to the second drive line 202 of the box forming machine 108. However, one will appreciate that one or more other embodiments of the packaging machine 100 may comprise a product feeder 106 having a first drive line 200 oriented at an angle other than perpendicular relative to the second drive line 202. For instance, the angle between the first drive line 200 and the second drive line 202 may be 0 degrees, 180 degrees, or any angle therebetween. Additionally, the first and second drive lines 200, 202, or portions thereof, may also be disposed or oriented in different planes. Also, one or more embodiments of the packaging system 100 described herein may comprise more than one product feeders 106, with each product feeder 106 having one or more drive lines 200. Likewise, one or more embodiments of the packaging system 100 may comprise more than one box forming machine 108, each box forming machine having one or more drive lines 202.

Figure 3:
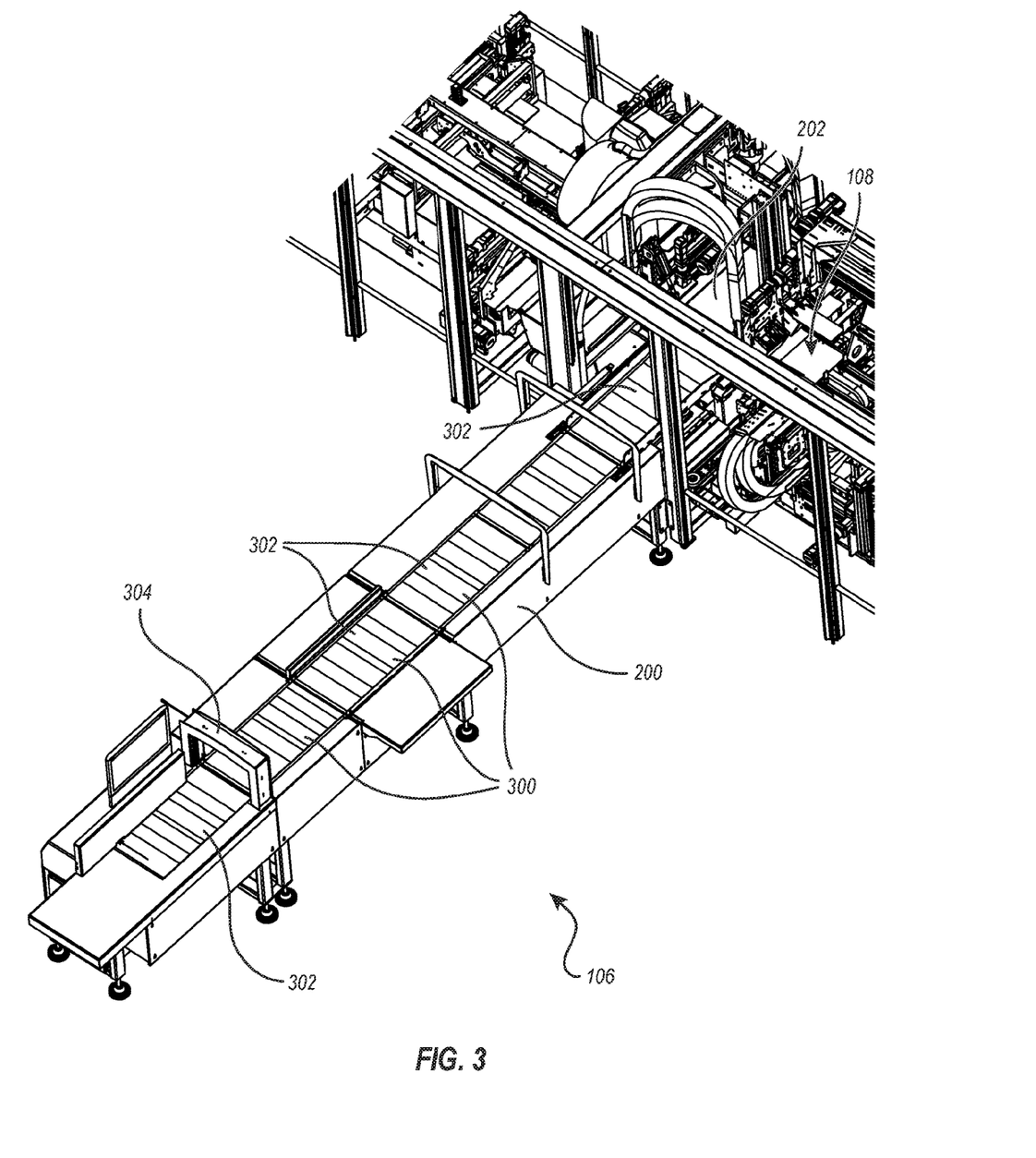
FIG. 3 illustrates a perspective view of an embodiment of a product feeder, including a plurality of conveyor mechanisms disposed longitudinally along a drive line of the product feeder.

FIG. 3 illustrates a closeup perspective view of an embodiment of a product feeder 106 according to the present disclosure. In the illustrated embodiment, the product feeder 106 comprises one or more conveyor mechanisms 300 disposed longitudinally along the first drive line 200. In the illustrated embodiment, the conveyor mechanisms 300 may comprise conveyor belts 302 that rotate to carry one or more products along the first drive line 200. One or more embodiments may include conveyor mechanisms 300 comprising mechanisms other than conveyor belts 302, such as chains, wheels, or the like, or combinations thereof.

In the illustrated embodiment of FIG. 3, the conveyor belts 302 may be disposed end-to-end so that one or more products placed thereon will travel down the first drive line 200 towards the second drive line 202 of the box forming machine 108. The number and position of the various conveyor mechanisms 300 or conveyor belts 302 may vary in other embodiments. For example, in one embodiment, one or more conveyor mechanisms 300 may be disposed side by side transversely across the first drive line 200. Also, for example, one embodiment may include more than or fewer than the number of conveyor mechanisms 300 illustrated herein.

The product feeder 106 may also comprise one or more scanning mechanisms 304 disposed at or near a first end of the first drive line 200. The scanning mechanism 304 illustrated in FIG. 3 comprises a cube scanner, through which one or more products may pass as the conveyor mechanisms 300 carry the products down the first drive line 200 towards the second drive line 202. The scanning mechanism 304 may be used to determine the dimensions of the one or more products being placed on the first drive line 200, including product heights, widths, and lengths. This dimensional data may then be stored and associated with the products being scanned.

Figure 4:
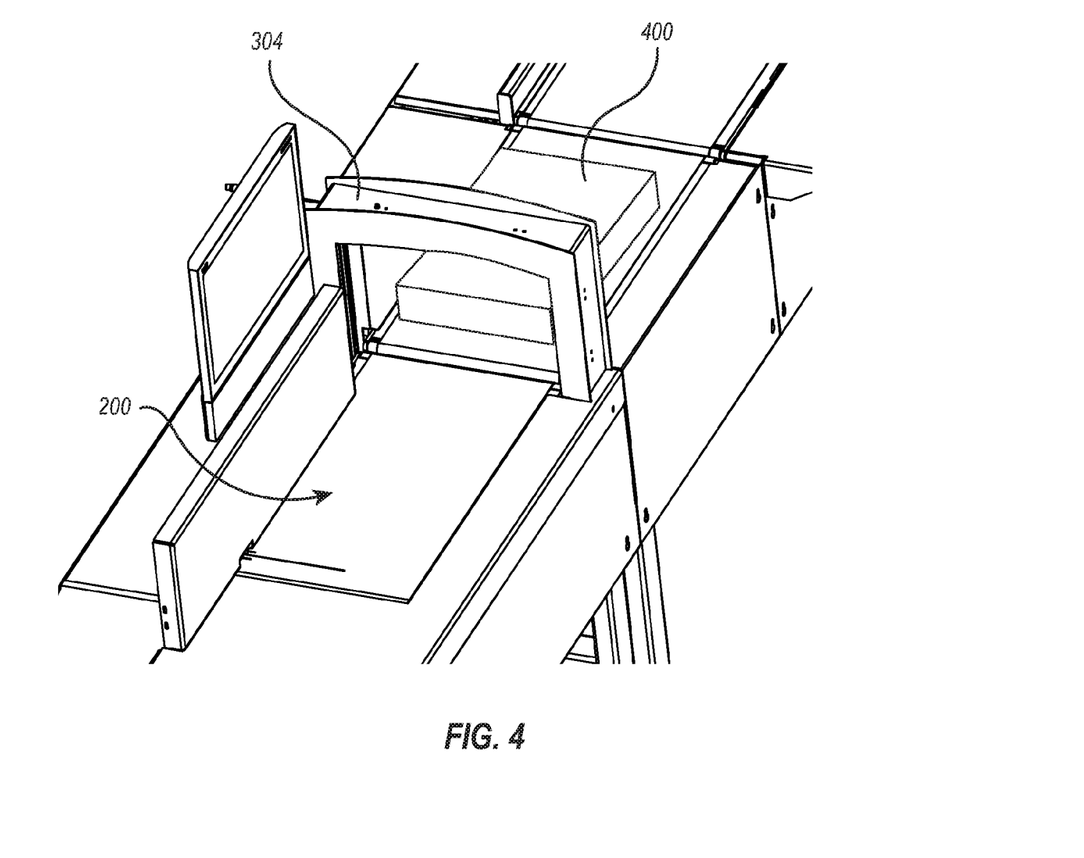
FIG. 4 illustrates an embodiment of a product scanning mechanism disposed at or near a first end of a product feeder.

FIG. 4 illustrates a perspective view of one or more products 400 being passed through the scanning mechanism 304 along the first drive line 200. In addition to scanning the one or more products to determine the dimensions thereof, the product feeder 106 may also include a scale to determine the weight of the one or more products.

Additionally, or alternatively, the scanning mechanism 304 of one or more embodiments may include a bar code reader, RFID scanner, or other way of determining the identity of products. In such an embodiment, the bar code reader, RFID scanner, or other identifying mechanism may be configured to scan one or more machine-readable representations of data, such as barcodes or QR-codes, associated with the one or more products being scanned. The data retrieved by the barcode scanner may contain prestored data associated with the one or more products being scanned. The prestored data may include dimensions of the one or more products, including the product height, width, and length.

In addition, the prestored data may comprise other information regarding the one or more products being scanned. For example, prestored data for each product being scanned may include product weight, center of gravity, moment of inertia, and coefficients of friction. Each product may have one or more coefficients of friction that depend on the material of the product or product packaging. These coefficients of friction may be used to determine the coefficient of friction between the one or more products and the conveyor mechanisms 300 of the first drive line and/or frictional coefficients between various products which may be stacked on top of one another or placed in contact next to each other.

In addition, these coefficients of friction may also be used to determine the coefficient of friction between the one or more products and the second drive line 202 of the box forming machine 108.

Additionally, or alternatively, one embodiment of the product feeder 106 may determine the product frictional coefficients by increasing a speed and/or an acceleration of conveyor mechanisms 300 of the drive lines 200, 202 until the one or more products placed thereon shift, slip, tip, or otherwise begin to fall out of position. The speed and/or acceleration at which the one or more products fall out of position may be used in conjunction with other prestored product data, such as the dimensions, weight, center of gravity, and moment of inertia noted above to calculate one or more coefficients of friction for each product. This data, including the calculated coefficients of friction, may be recorded and stored as data associated with each product. This data may be retrieved as prestored data associated with the same or similar products that are subsequently placed on the product feeder 106.

The data retrieved by the scanning mechanism 304, and/or barcode scanner, which is associated with each product, may be relayed to the blank cutting machine 104 to determine the size and configuration of the blank to be cut for packaging. For example, the dimensional data of each product may be relayed to the blank cutting machine 104 to ensure that a properly sized blank is cut, which is customized to the product.

In addition, prestored data associated with each product and retrieved by the scanning mechanism 304 may be used to determine an appropriate speed and/or acceleration profile for each drive line 200, 202. A speed and/or an acceleration profile comprises the speed and/or acceleration of the conveyor mechanisms 300 of the drive lines 200, 202 over time or distance. For example, in one embodiment, the first drive line 200 may have an acceleration profile that accelerates a rotation of one or more conveyor belts 302 from an initial lower speed to a higher speed as the conveyor belts 302 carry one or more products down the first drive line 200 toward the second drive line 202. Additionally, or alternatively, the same acceleration profile may include decreasing the speed of the conveyor belts 302 towards the end of the first drive line 200 as the one or more products approaches the second drive line 202.

In such an embodiment, the speed and/or acceleration profile may serve to maintain the one or more products placed on the first drive line 200 at a low speed where the products are placed on the conveyor mechanism 300 and/or as the products pass by or through the scanning mechanism 304. Placing the one or more products onto conveyor mechanisms 300 that initially accelerate the products too quickly may make it difficult to place the products on the conveyor mechanisms 300. Also, accelerating the products through or under the scanning mechanism too quickly may cause the scanning mechanism 304 to not function properly. Likewise, the acceleration profile may reduce the speed of the products placed on the first drive line 200 as the products approach the second drive line 202 in preparation for transferring the products onto the second drive line 202. Doing so too quickly may lead to the one or more products tipping, slipping, shifting, or otherwise falling out of position or being damaged when transferred.

One will appreciate that in one or more embodiments, each drive line 200, 202 may comprise any number of acceleration profiles that include the speeds and accelerations at which one or more products are moved down each drive lines 200, 202. Appropriate acceleration profiles may be determined by the methods described above or determined from the prestored data associated with each product as retrieved by the scanning mechanism 300.

Accordingly, each drive line 200, 202 may then be run at appropriate acceleration profiles uniquely tailored on the fly to each product or stack of products placed on the product feeder 106. The appropriate acceleration profiles may be adjusted based on prestored and/or determined data associated with each product or group of products as described herein. The appropriate acceleration profile associated with each product or group of products may avoid accelerating the products too quickly along the drive lines 200, 202. This way, the product feeder 106 and the box forming machine 108 may avoid tipping, slipping, shifting, or otherwise causing the one or more products placed on the drive lines 200, 202 to fall out of position and/or be damaged. In addition, preventing the products from falling out of position may ensure that the products are properly placed onto the blank.

Figure 5:
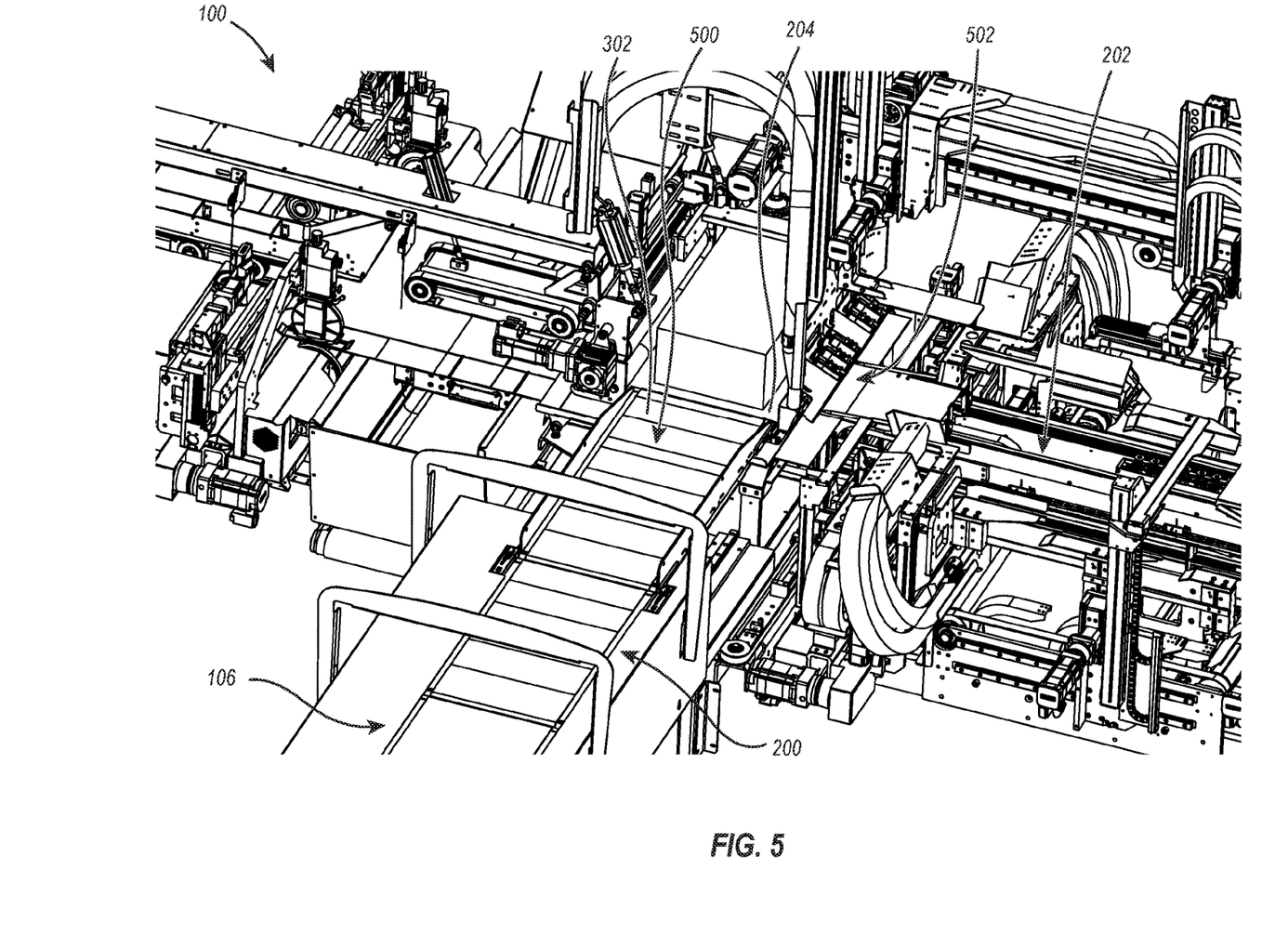
FIG. 5 illustrates a perspective view of a translating portion of a product feeder, disposed at or near a second end of the product feeder, which facilitates transferring one or more products from a first drive line of the product feeder to a second drive line of a box forming machine.

Turning now to FIG. 5, the first drive line 200 of the product feeder 106 may comprise one or more translating portions 500 disposed along an end portion of the first drive line 200 at or near the second drive line 202. The translating portion 500 of the first drive line 200 may comprise a translating mechanism that causes the translating portion 500 to translate towards and away from the second drive line 202, or a portion thereof. The translating portion 500 may also comprise one or more conveyor mechanisms, such as the conveyor belt 302 shown in FIG. 5, which rotates to transfer one or more products along the translating portion 500 while the translating mechanism translates the translating portion 500.

One or more embodiments of the product feeder 106 may comprise a translating portion 500 that extends partially or all the way along the first drive line 200. In one or more embodiments, for example, the translating mechanism may cause all or most of the first drive line 200 to translate towards and away from the second drive line 202. In one or more embodiments, the translating portion 500 may extend along the first drive line to a greater or lesser degree than that shown in FIG. 5.

Also, as shown in FIG. 5, one embodiment of the packaging machine 100 may comprise an intermediate drive line 204, which may also include one or more conveyor belts. In such an embodiment, the intermediate drive line 204 may be disposed above the second drive line 202 on which the blank 502 is being transported. In this way, the blank 502 may move along the second drive line 202 underneath the intermediate drive line 204, while the translating portion 500 of the first drive line translates toward and away from the second drive line 202.

Figure 6A:
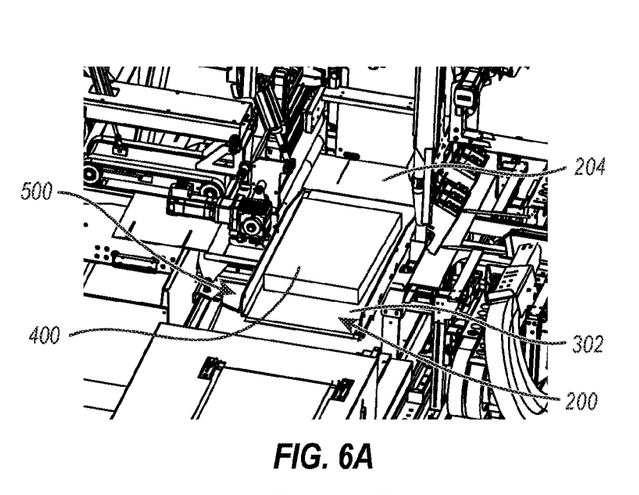
FIG. 6A shows a translating portion of a product feeder translating toward the drive line of a box forming machine while a conveyor belt of the translating portion rotates.

FIGS. 6A-6D illustrate how the translating portion 500 of the first drive line 200 and the intermediate drive line 204 may facilitate a smooth transition of the one or more products 400 from the first drive line 200 to the second drive line 202. As shown in FIGS. 6A-6D, one embodiment of the first drive line 200 and translating portion 500 may be positioned to extend above the intermediate drive line 204. A translating mechanism (not shown) may translate the translating portion 500 toward the intermediate drive line 204 while the conveyor belt 302 rotates and moves the product 400 forward on the translating portion 500. FIG. 6A illustrates a translating portion that is not fully translated over the intermediate drive line 204.

Figure 6B:
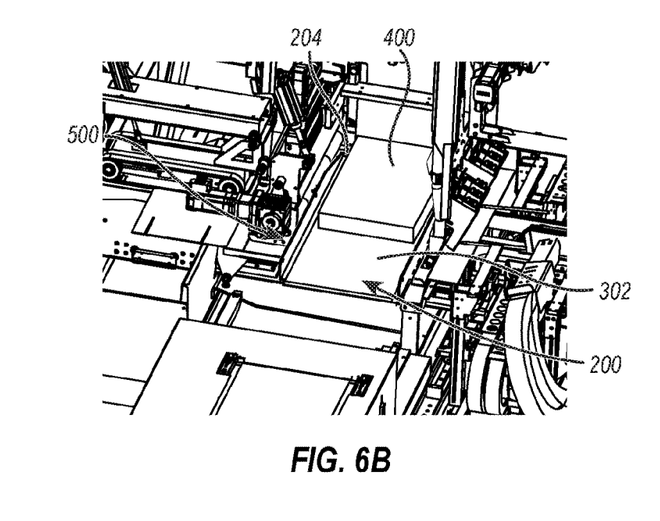
FIG. 6B shows the translating portion shown in FIG. 6 translated fully toward the drive line of the box forming machine.

In the illustrated embodiment of FIG. 6B, the first drive line 200 has been fully translated over the intermediate drive line 204. However, in one or more embodiments, the translating mechanism may translate the translating portion 500 only partially over the intermediate drive line 204. Other embodiments may include translating the translating portion 500 to varying degrees toward and/or over the intermediate drive line 204.

Figure 6C:
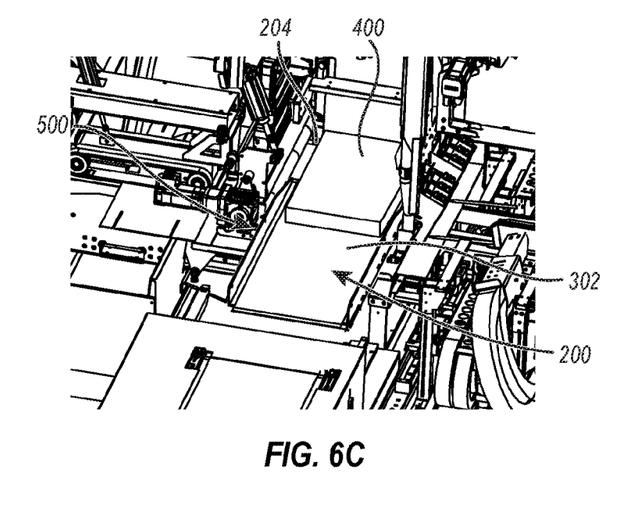
FIG. 6C shows the translating portion shown in FIGS. 6A and 6B translating away from the drive line of the box forming machine while the conveyor belt of the product feeder rotates to transfer the one or more products to the second drive line of the box forming machine.

FIG. 6B shows the translating portion 500 fully translated toward/over the intermediate drive line 204 with the product 400 moved to the end of the translating portion 500 by the conveyor belt 302. Once the translating portion 500 has been translated fully toward/over the intermediate drive line 204, the translating mechanism may begin translating the translating portion 500 away from the intermediate drive line 204 while the conveyor belt 302 of the first drive line 200 continues to move the product 400 toward the end of the translating portion 500 and the intermediate drive line 204. Accordingly, as shown in FIG. 6C, the product 400 may begin to move beyond the end of the first drive line 200 and transfer to the intermediate drive line 204.

Figure 6D:
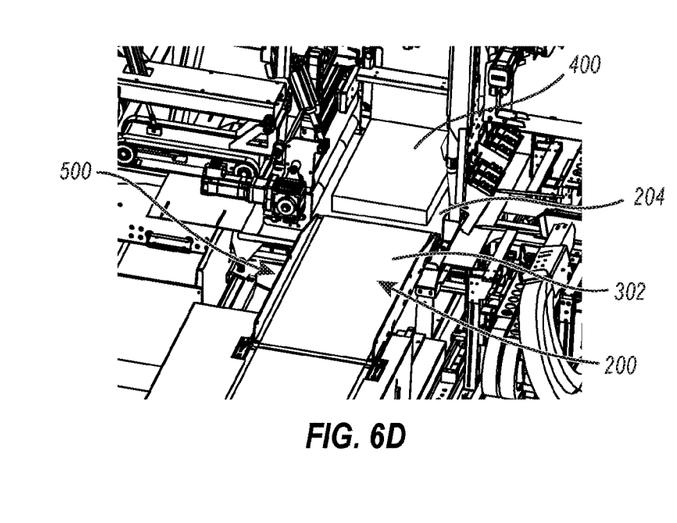
FIG. 6D shows the translating portion shown in FIGS. 6A-6C translating further away from the drive line of the box forming machine while the conveyor belt of the product feeder rotates to transfer the one or more products from the product feeder to the box forming machine.

Once the product 400 is completely transferred onto the intermediate drive line 204, as shown in FIG. 6D, the translating portion 500 of the first drive line 200 may translate fully away from the intermediate drive line 204. The translating portion 500 of the first drive line 200 may translate fully away from the intermediate drive line 204 in preparation for transferring subsequent products from the first drive line 200 to the intermediate drive line 204.

Finally, once the product 400 has been transferred onto the intermediate drive line 204, the intermediate drive line 204 may transfer the product onto the blank travelling under the intermediate drive line 204 along the second drive line 202. Accordingly, as with other drive lines 200, 202, the intermediate drive line 204 may comprise one or more conveyor mechanisms, such as conveyor belts, which move the product. Thus, as the blank moves along the second drive line 202 underneath the intermediate drive line 204, the intermediate drive line 204 can transfer the product 400 onto the blank (in a similar manner as the product being transferred from the first drive line 200 to the intermediate drive line 204 (either with or without a translating portion as part of the intermediate drive line). From there, the blank and the product 400 positioned thereon may be transferred along the second drive line 202 through the box forming machine 108. The box forming machine 108 may then form the box around the product 400.

Acceleration profiles may include the acceleration and speed with which the translating mechanism translates the translating portion 500. The intermediate drive line 204 and the second drive line 202 may also have acceleration profiles. Again, as described above, the appropriate acceleration profiles of the translating portion 500, the intermediate drive line 204, and/or the second drive line 202 may be selected for each product or group of products to ensure that the transfer of products from the first drive line 200 to the second drive line 202 occurs at appropriate speeds and accelerations. As such, the transfer of products from one drive line to the next may be done without causing the products to fall out of position. Again, this may ensure that the products are not damaged and that the products are placed in the proper position on the blank.

Figure 7:
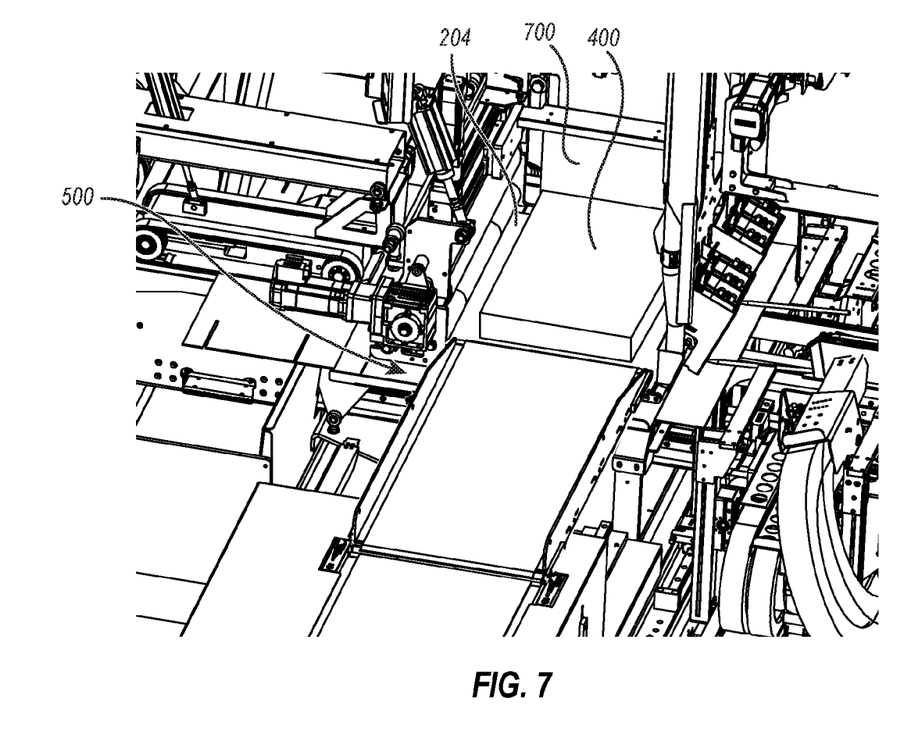
FIG. 7 shows an embodiment of a backstop of the second drive line of the box forming machine facilitating proper positioning of the one or more products.

FIG. 7 illustrates a backstop 700 disposed on the intermediate drive line 204. The backstop may be rigidly placed, forming a barrier that the product 400 may not pass when being transferred from the first drive line 200 to the intermediate drive line 204. In this way, the backstop 700 may further ensure proper positioning of the product 400 on the blank when transferred. A similar backstop may also be included to ensure proper positioning of the product 400 when being transferred from the intermediate drive line 204 to the second drive line 202. In some embodiments, one or more of the backstops may have fixed positions, while in other embodiments one or more of the backstops may be selectively movable.

In some embodiments, one or more additional scanning mechanisms (e.g., photosensors, light curtains, etc.), similar to scanning mechanism 304, may be positioned near or at the end of the first drive line 200, near or at the transition from the first drive line 200 to the intermediate drive line 204, and/or near or at the transition between the intermediate drive line 204 and the second drive line 202. The one or more additional scanning mechanisms may detect the position of the product(s) being transferred between the first, intermediate, and/or second drive lines 200, 204, 202. In some embodiments, the one or more additional scanning mechanisms may detect whether the position(s) and/or orientation(s) of the product(s) have slipped, tilted and/or shifted as the product(s) move along or between the first, intermediate, and/or second drive lines 200, 204, 202. The information regarding whether, how much, and in what direction the product(s) have moved can be directly used to adjust the speed and/or acceleration of the first, intermediate, and/or second drive lines 200, 204, 202 to compensate for the movement of the product(s) and/or reposition the product(s). The information can also be used to update a database regarding the product(s), including the propensity of the product(s) to move under known speed and acceleration conditions.

Accordingly, the apparatus and methods described herein may enable the packaging system 100 to adjust the speeds and/or accelerations of the conveyor mechanisms on the fly as products of various sizes, shapes, weights, and quantities are placed on the conveyor mechanisms for packaging. The methods and apparatus described herein may do so rapidly and smoothly without disrupting the package forming process or damaging the products.

Further examples consistent with the present teachings are set out in the following numbered clauses:

Clause 1: A method of feeding products into a packaging machine, the method comprising:
  placing one or more products on a first drive line;
  determining a first friction between the one or more products and the first drive line;
  adjusting a first acceleration profile of the first drive line based on the first friction of the one or more products and the first drive line; and
  transferring the one or more products placed on the first drive line to a second drive line.

Clause 2: The method of claim 1, further comprising determining dimensions of the one or more products, wherein determining the dimensions of the one or more products comprises retrieving prestored data associated with the one or more products, the prestored data including the dimensions.

Clause 3: The method of clause 2, wherein the step of retrieving the prestored data comprises scanning a machine-readable representation of data associated with the one or more products.

Clause 4: The method of any of clauses 1-3, wherein determining the first friction comprises retrieving prestored data associated with the one or more products.

Clause 5: The method of clause 4, wherein the prestored data associated with the first friction comprises one or more coefficients of friction between the one or more products and the first drive line.

Clause 6: The method of any of clauses 1-5, wherein the second drive line transports the one or more products through a box forming machine, the second drive line having a second acceleration profile.

Clause 7: The method of clause 6, further comprising adjusting the second acceleration profile based on a second friction between the one or more products and the second drive line.

Clause 8: The method of clause 7, wherein the second friction is determined by retrieving a prestored data associated with the one or more products, the prestored data associated with the one or more products including one or more coefficients of friction associated with the one or more products.

Clause 9: The method of any of clauses 1-8, further comprising determining a third friction between two or more stacked products that are placed on the first drive line.

Clause 10: The method of clause 9, further comprising adjusting the first acceleration profile based on the third friction.

Clause 11: The method of clause 9 or 10, wherein determining the third friction comprises retrieving pre-stored data associated with the one or more products.

Clause 12: The method of clause 11, wherein the pre-stored data associated with the third friction comprises one or more coefficients of friction between the two or more stacked products.

Clause 13: The method of any of clauses 1-12, wherein the first drive line comprises a conveyor belt and wherein the step of transferring the one or more products placed on the first drive line to the second drive line comprises:
  rotating the conveyor belt; and
  translating at least a portion of the first drive line towards and away from the second drive line while the conveyor belt rotates.

Clause 14: The method of any of clauses 1-13, further comprising:
  detecting one or more of the position or orientation of the one or more products adjacent an end of the first drive line, a transition between the first drive line and the second drive line, or along the second drive line; and
  based on the detected position or orientation of the one or more products, determining whether the one or more products have slipped, tilted, or shifted from an initial orientation or position.

Clause 15: The method of clause 14, further comprising:
  adjusting the first acceleration profile of the first drive line or another acceleration profile based on the detected position or orientation of the one or more products.

Clause 16: The method of clause 14 or 15, further comprising:
  updating a database with data regarding the detected position and determination of whether the one or more products have slipped, tilted, or shifted from an initial orientation or position.

Clause 17: A method of feeding products into a packaging machine, the method comprising:
  placing one or more products on a first drive line;
  determining a first friction between the one or more products and the first drive line;
  adjusting a first acceleration profile of the first drive line based on the first friction of the one or more products;
  transferring the one or more products placed on the first drive line to a second drive line having a second acceleration profile;
  determining a second friction between the one or more products and the second drive line; and
  adjusting the second acceleration profile based on the second friction of the one or more products.

Clause 18: The method of clause 17, wherein determining the first friction comprises increasing an initial acceleration of the first acceleration profile until the one or more products at least begin to fall out of position on the first drive line.

Clause 19: The method of clause 18, further comprising storing the first friction as data associated with the one or more products and adjusting the first acceleration profile based on the data when one or more of the same or similar products are subsequently placed on the first drive line.

Clause 20: The method of any of clauses 17-19, wherein determining the second friction comprises increasing an initial acceleration of the second acceleration profile until the one or more products at least begin to fall out of position on the second drive line.

Clause 21: The method of clause 20, further comprising storing the second friction as data associated with the one or more products and adjusting the second acceleration profile based on the data when one or more of the same or similar products are subsequently placed on the second drive line.

Clause 22: The method of any of clauses 17-21, wherein the first drive line comprises a conveyor belt and wherein the step of transferring the one or more products placed on the first drive line to the second drive line comprises:
  rotating the conveyor belt; and
  translating at least a portion of the first drive line towards and away from the second drive line while the conveyor belt rotates.

Clause 23: The method of clause 22, wherein the first drive line comprises a translating acceleration profile and wherein the step of translating the first drive line towards and away from the second drive line includes adjusting the translating acceleration profile of the first drive line based on one or more of the determined first friction and the determined second friction of the one or more products.

Clause 24: The method of any of clauses 17-23, further comprising determining dimensions of the one or more products.

Clause 25: A packaging machine, comprising:
  a first drive line, comprising:
    a first conveyor mechanism that guides one or more products along the first drive line; and
    a translating mechanism configured to selectively translate the first drive line in at least two directions;
  a second drive line comprising a second conveyor mechanism; and
  a scanning mechanism configured to determine dimensions and one or more coefficients of friction associated with the one or more products.

Clause 26: The packaging machine of clause 25, wherein the scanning mechanism comprises a barcode scanner disposed at or near a first end of the first drive line.

Clause 27: The packaging machine of clause 25 or 26, wherein the scanning mechanism comprises a cube scanner disposed at or near a first end of the first drive line.

Clause 28: The packaging machine of any of clauses 25-27, wherein the second drive line comprises a backstop disposed at or near a first end of the second drive line.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of feeding products into a packaging machine, the method comprising:
  placing one or more products on a first drive line;

determining a first friction between the one or more products and the first drive line;
adjusting a first acceleration profile of the first drive line based on the first friction of the one or more products and the first drive line; and
transferring the one or more products placed on the first drive line to a second drive line,
wherein the first acceleration profile (i) accelerates a rotation of one or more conveyor belts from an initial lower speed to a higher speed as the conveyor belts carry the one or more products along the first drive line towards the second drive line and (ii) decreases the speed of the one or more conveyor belts towards an end of the first drive line as the one or more products approach the second drive line.

2. The method of claim 1, further comprising determining dimensions of the one or more products, wherein determining the dimensions of the one or more products comprises retrieving prestored data associated with the one or more products, the prestored data including the dimensions.

3. The method of claim 2, wherein the step of retrieving the prestored data comprises scanning a machine-readable representation of data associated with the one or more products.

4. The method of claim 1, wherein determining the first friction comprises retrieving prestored data associated with the one or more products.

5. The method of claim 4, wherein the prestored data associated with the first friction comprises one or more coefficients of friction between the one or more products and the first drive line.

6. The method of claim 1, wherein the second drive line transports the one or more products through a box forming machine, the second drive line having a second acceleration profile.

7. The method of claim 6, further comprising adjusting the second acceleration profile based on a second friction between the one or more products and the second drive line.

8. The method of claim 7, wherein the second friction is determined by retrieving a prestored data associated with the one or more products, the prestored data associated with the one or more products including one or more coefficients of friction associated with the one or more products.

9. The method of claim 1, further comprising determining a third friction between two or more stacked products that are placed on the first drive line.

10. The method of claim 9, further comprising adjusting the first acceleration profile based on the third friction.

11. The method of claim 9, wherein determining the third friction comprises retrieving prestored data associated with the one or more products.

12. The method of claim 11, wherein the prestored data associated with the third friction comprises one or more coefficients of friction between the two or more stacked products.

13. The method of claim 1, wherein the first drive line comprises a conveyor belt and wherein the step of transferring the one or more products placed on the first drive line to the second drive line comprises:
rotating the conveyor belt; and
translating at least a portion of the first drive line towards and away from the second drive line while the conveyor belt rotates.

14. The method of claim 1, further comprising:
detecting one or more of the position or orientation of the one or more products adjacent an end of the first drive line, a transition between the first drive line and the second drive line, or along the second drive line; and
based on the detected position or orientation of the one or more products, determining whether the one or more products have slipped, tilted, or shifted from an initial orientation or position.

15. The method of claim 14, further comprising:
adjusting the first acceleration profile of the first drive line or another acceleration profile based on the detected position or orientation of the one or more products.

16. The method of claim 14, further comprising:
updating a database with data regarding the detected position and determination of whether the one or more products have slipped, tilted, or shifted from an initial orientation or position.

17. A method of feeding products into a packaging machine, the method comprising:
placing one or more products on a first drive line;
determining a first friction between the one or more products and the first drive line;
adjusting a first acceleration profile of the first drive line based on the first friction of the one or more products;
transferring the one or more products placed on the first drive line to a second drive line having a second acceleration profile;
determining a second friction between the one or more products and the second drive line; and
adjusting the second acceleration profile based on the second friction of the one or more products.

18. The method of claim 17, wherein determining the first friction comprises increasing an initial acceleration of the first acceleration profile until the one or more products at least begin to fall out of position on the first drive line.

19. The method of claim 18, further comprising storing the first friction as data associated with the one or more products and adjusting the first acceleration profile based on the data when one or more of the same or similar products are subsequently placed on the first drive line.

20. The method of claim 17, wherein determining the second friction comprises increasing an initial acceleration of the second acceleration profile until the one or more products at least begin to fall out of position on the second drive line.

21. The method of claim 20, further comprising storing the second friction as data associated with the one or more products and adjusting the second acceleration profile based on the data when one or more of the same or similar products are subsequently placed on the second drive line.

22. The method of claim 17, wherein the first drive line comprises a conveyor belt and wherein the step of transferring the one or more products placed on the first drive line to the second drive line comprises:
rotating the conveyor belt; and
translating at least a portion of the first drive line towards and away from the second drive line while the conveyor belt rotates.

23. The method of claim 22, wherein the first drive line comprises a translating acceleration profile and wherein the step of translating the first drive line towards and away from the second drive line includes adjusting the translating acceleration profile of the first drive line based on one or more of the determined first friction and the determined second friction of the one or more products.

24. The method of claim 17, further comprising determining dimensions of the one or more products.

25. A packaging machine, comprising:
a first drive line, comprising:

a first conveyor mechanism that guides one or more products along the first drive line; and a translating mechanism configured to selectively translate the first drive line in at least two directions;

a second drive line comprising a second conveyor mechanism; and a scanning mechanism configured to determine dimensions and one or more coefficients of friction associated with the one or more products.

26. The packaging machine of claim 25, wherein the scanning mechanism comprises a barcode scanner disposed at or near a first end of the first drive line.

27. The packaging machine of claim 25, wherein the scanning mechanism comprises a cube scanner disposed at or near a first end of the first drive line.

28. The packaging machine of claim 25, wherein the second drive line comprises a backstop disposed at or near a first end of the second drive line.

\* \* \* \* \*